Figure 1:
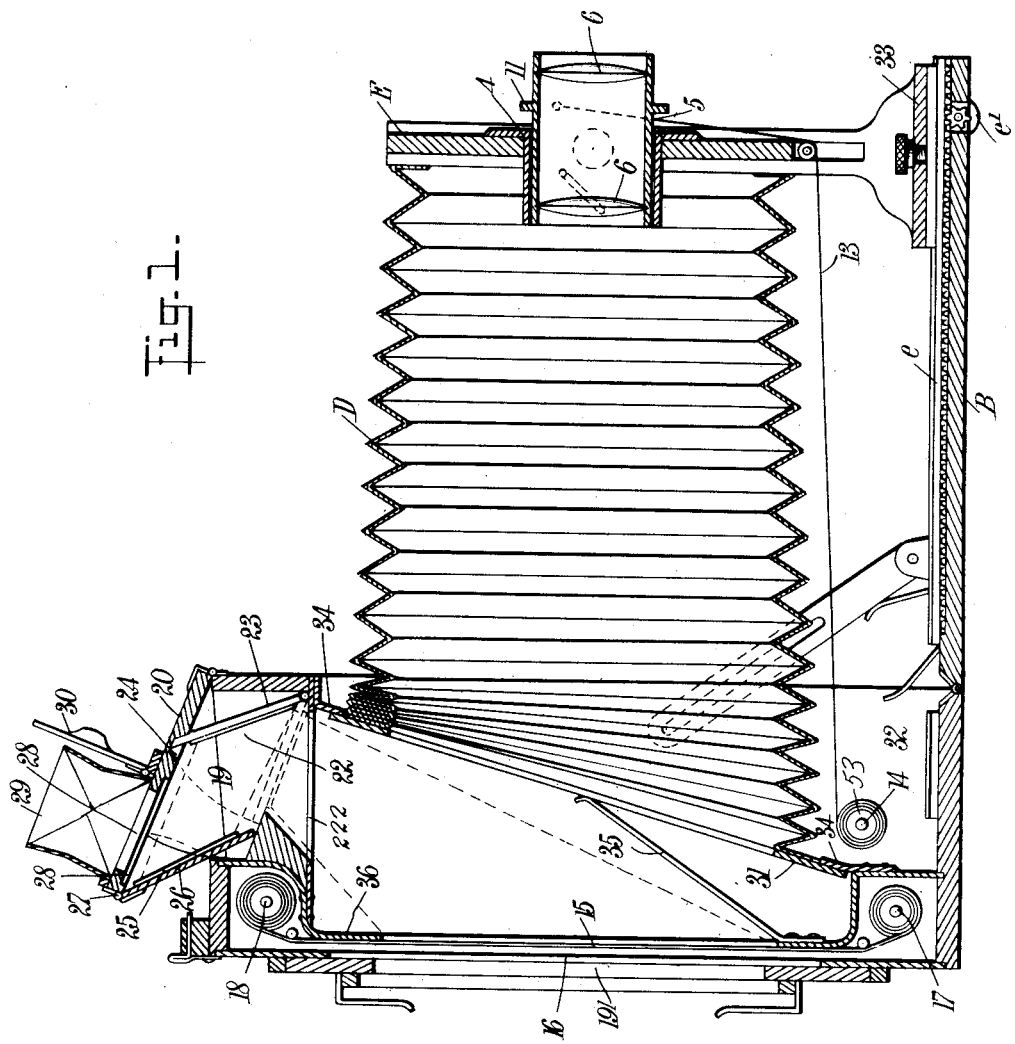

A. VORIS.
PHOTOGRAPHIC CAMERA.
APPLICATION FILED DEC. 9, 1911.

1,108,033.

Patented Aug. 18, 1914.

2 SHEETS—SHEET 1.

WITNESSES

INVENTOR
Anthony Voris
BY Munn & Co.
ATTORNEYS

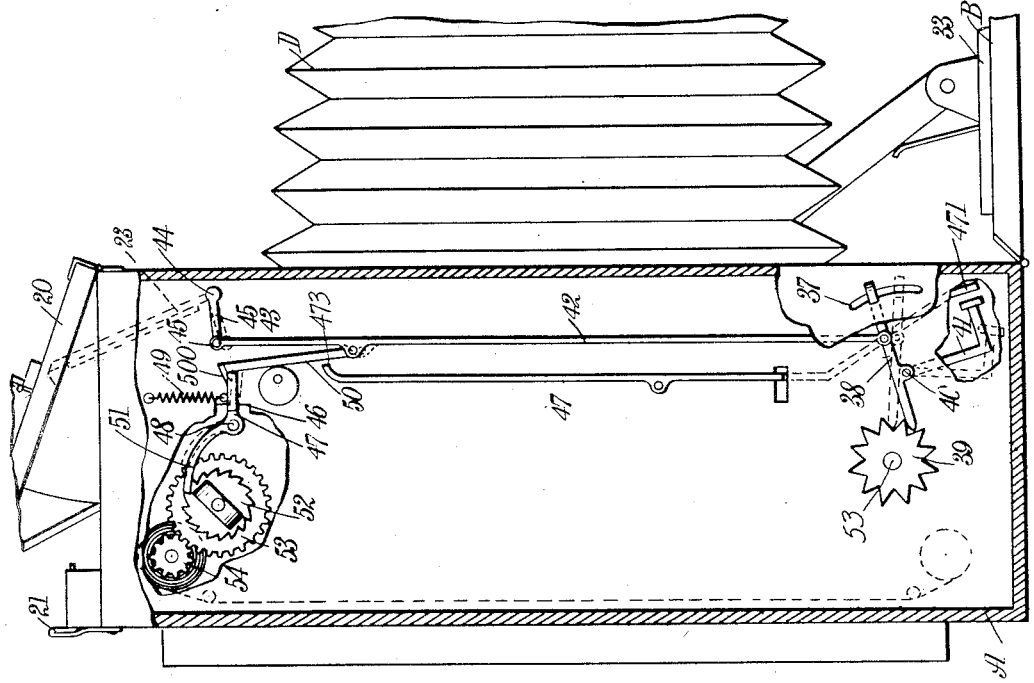
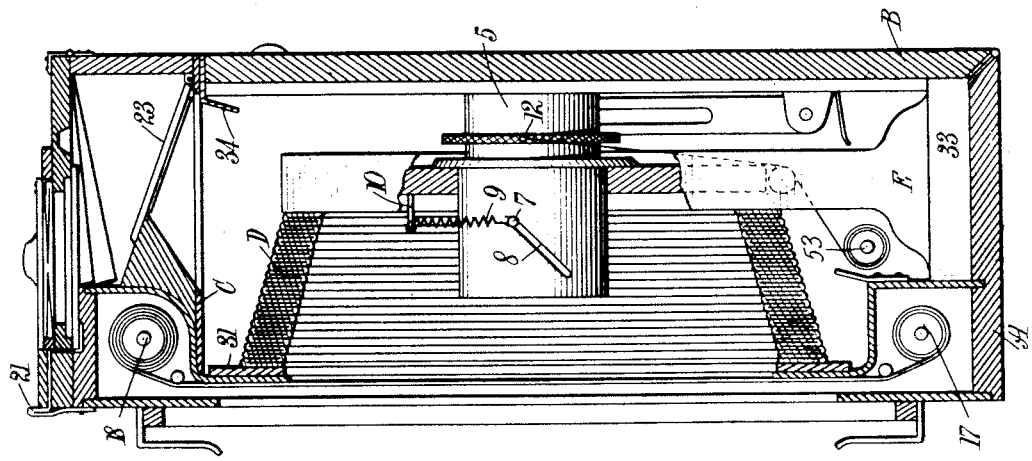

UNITED STATES PATENT OFFICE.

ANTHONY VORIS, OF NEW YORK, N. Y.

PHOTOGRAPHIC CAMERA.

1,108,033. Specification of Letters Patent. Patented Aug. 18, 1914.

Application filed December 9, 1911. Serial No. 664,696.

*To all whom it may concern:*

Be it known that I, ANTHONY VORIS, a citizen of the United States, and a resident of the city of New York, borough of Manhattan, in the county and State of New York, have invented a new and Improved Photographic Camera, of which the following is a full, clear, and exact description.

My invention relates to new and useful improvements in photographic cameras, and relates more particularly to that style of camera in which the image formed by the lens is focused upon a screen at the front of the plate-holder and is observed by the operator through a suitably located aperture in the camera box.

An object of my invention is to provide a device whereby at the time of taking the picture, the image is automatically focused on the sensitized plate, said screen having an opening at its upper part, the lower part of said screen being opaque to shut out light from the plate, the aperture through which the image is viewed is closed to shut out extraneous light and the focusing screen caused to rush across the plate, said screen having an opening at its upper part and then an opaque part to shut out light from the plate, this being effected instantaneously.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in all the figures, and in which—

Figure 1 is a vertical longitudinal view taken through a preferred embodiment of my invention, showing the bellows in extended position; Fig. 2 is a view similar to Fig. 1, showing the bellows in collapsed position and the camera closed; and Fig. 3 is a side view of part of the camera, with a portion of the side broken away to show the internal mechanism positioned within a side compartment.

In the several figures is shown a plate camera having a box or casing A provided with a forward opening $a$ adapted to be closed by a hinged bed B, and within which fits a frame C. A bellows D extends from this frame C to the camera front E, as is customary with cameras of this general character. The front E is adjustably mounted upon the rack $e$, which rack is mounted on the bed B and is actuated through the operation of a knob $e'$ to focus the camera.

Rigidly mounted in the camera front E, is a cylindrical thimble 4, rotatably mounted in which thimble is a cylindrical sleeve 5 carrying a focusing lens 6. Rigidly mounted upon the exterior of the cylindrical sleeve 5 is a pin 7 positioned within a downwardly and rearwardly diagonally-extending slot 8 in the thimble 4, which pin is engaged by one end of a tension spring 9, the opposite and upper end of which is attached to a pin 10 projecting inwardly from the front E. By this construction, the lens 6 is normally maintained in its advanced position, and the length of the horizontal projection of the slot 8 is equal to the distance between the focusing screen and the plate hereinafter described. A stop ring 11, forming an abutment for the lens-carrying sleeve 5 against the front E, has a pin 12 projecting therefrom, to which pin is attached a flexible connection 13, the opposite end of which is disposed about a spring roller 14 mounted within the casing A. By this construction, it will be understood that drawing the flexible member 13 will rotate the lens-carrying sleeve 5, which rotation will cause the lens to move toward the sensitive plate a distance equal to the distance between the focusing screen and the sensitive plate. The focusing screen 15 is disposed immediately in front of the exposed opening 16 in the rear of the casing A and in optical alinement with the lens 6, and has its opposite ends disposed on spring drums 17 and 18 journaled in the casing A below and above the opening. The screen 15 is white on the side facing the lens and upon said screen is adapted to be formed the picture image. Within the screen is an aperture, not shown, which may be caused to speed across the opening front of the plate, when it is desired to bring the image on the sensitive plate 19¹, the exposure being terminated by the upper part of the curtain which again closes the light opening 16. The amount of light may be varied by causing the curtain to travel across the plate at any suitable speed which is obtained by altering the spring tension in drum 17, or the size of the aperture in curtain 15 may be changed.

In order to view the image formed on the screen 15, the top of the casing A has an opening 19 therein, and the top of the frame has an opening 222 which openings are normally closed by a trap door 20 hinged to its front edge, said door being maintained in closed position by means of a spring catch 21. The image on the screen 15 is first reflected on a mirror 22 mounted on the under side of a trap door 23 hinged to the front of the casing A above the frame C and below the door 20, the upper end of said door 23 being disposed in a recess 24 in the under side of the door 20. From the mirror 22, the image is reflected to a second mirror 25 mounted on a trap door 26, the upper edge of which is pivoted at 27 to the forward under edge of the door 20, and the mirror 25 is adapted to fit within a recess 28 in the under side of the door 20 when the door is in the folded position shown more particularly in Fig. 2. The mirror 25 is so disposed relative to the view opening 28 extending through the door 20, that by looking through the opening 28, the image in erect position is seen on the mirror 25. If desired, a collapsible hood 29 may be disposed about the opening 28 to shut off extraneous light. A small trap door 30 is hinged to the top of the door 20, to close the opening 28 when desired. By this construction of the door 20 and its attached parts, it will be seen that the arrangement of mirrors and attached doors may readily be folded into position as shown in Fig. 2, displaying a neat, compact casing, and it will also be seen that the inclining of the rear frame 31 carrying the inner end of the extended bellows D, affords a relatively large space 32 in which is disposed the roller 14 and the base 33 of the camera front E, the frame 31 resting against projections 34 on the front of the frame C when in extended position, in which position it is maintained by the spring 35, said rear frame 31 resting against the back 36 of the frame C when in collapsed position, as shown more particularly in Fig. 2.

With the device in the position shown in Fig. 1, an image is focused on the screen 15 and reflected to the mirror 22 and to the mirror 25, and is viewed through the opening 28, it being desirable to be able to see this image up to the moment of taking the picture. In taking the picture, it is, of course, desirable to instantaneously close the opening through which the image is viewed, in order to shut off extraneous light from the box, to focus the image on the sensitive plate, and then to cause an aperture in the screen to rush across the plate, the aperture affecting the exposure. For this purpose, a button 37 projects from the side of the box, which button forms one end of a lever 38, the other end of the lever engaging a star wheel 39 rigidly mounted upon the shaft 53 carrying the spring roller 14. Rigidly mounted upon the lever 38, at its fulcrum 40, is an L-shaped stop 41 adapted to be engaged by the hinged bed to automatically close the trap door 23, as hereinafter described. Pivoted to the reach rod 42 intermediate its length, is one end of a catch rod 50, a nose 500 on the end of which engages on the top of one arm 46 of a lever 47 pivoted to the end of the casing at the fulcrum 48 of the lever, a spring 49 has one end attached to the arm 46, and the other end attached to the casing, to maintain the lever in the position shown in Fig. 3, which position is limited by the nose 500. Pivoted to the side of the casing is an actuating lever 472, the upper end of which has an outturned finger 473 to contact with the rod 50 when the opposite end 471 is engaged by the closing bed or door. This movement of the lever 47 will first disengage the nose 500 from the lever 46, and then bearing on the lever 38, close the trap door 23 as hereinafter described. It will be noted that the closing of the bed does not release the pawl from the ratchet wheel 52, in closing the camera, so that it is not necessary to rewind the shutter 15 on reopening the camera for the next exposure. It will be seen by this construction, that after the image is focused on the screen 15, the button 37 is pressed downward which, through the lever mechanism, rotates the star wheel 39, which in turn acts through the flexible connection 13, to rotate the lens 6 inwardly, so that the image is now focused on the sensitive plate 191. At the same time, through the reach rod 42 acting on a lever 45, the door 23 is brought down to close the opening 19, as shown in dotted lines in Fig. 1. The reach rod 50 disengages the pawl 51 from its engagement with the wheel 52, thereby permitting the spring roller 17 to rotate the screen, to bring the opening in said screen in alinement with the opening 16 in front of the sensitive plate, permitting the image to be received on said sensitive plate.

It is noted that the entire cycle of operation is practically instantaneous, permitting the focusing of the image on the focusing screen up to the moment of taking the picture.

While a preferred embodiment of the invention has been described, it is to be understood that many changes could be made in the above construction and many apparently widely different embodiments of this invention could be made without departing from the scope thereof.

Having thus described my invention, I claim as new and desire to secure by Letters Patent:

1. In a camera, a casing provided with a visual opening therein, a focusing screen in the rear of said casing, and a mirror for reflecting an image from said screen, through said opening and means closing said opening at the moment of taking the picture.

2. In a camera, a casing having an opening in the top thereof, a door having an opening therethrough, said door adapted to close the opening in said casing, a mirror having its upper edge hinged to the outer free edge of said door and projecting into the opening in said casing and facing said opening in the door, a second mirror facing said first-mentioned mirror and pivoted within said casing and having its upper end in engagement with the under side of said door when the latter is in raised position, and an image screen, said screen and mirrors arranged relative to each other, whereby the mirrors reflect the image from said screen through the opening in said door.

3. In a camera, a casing having an image screen in the rear thereof, and adapted to carry a sensitive surface in rear of said screen, said screen mounted on spring rollers, a pawl holding one of said spring rollers in position, a lens, means for operating said lens to focus the image on said screen, and means adapted to move said lens toward said sensitive plate a distance equal to the distance between the screen and plate, and a connection between said means and said holding pawl, whereby the actuation of said means to move said lens, will automatically release said pawl from said spring roller, for causing said roller to withdraw the screen from its position in front of said sensitive plate, for causing the focusing of the image on said sensitive plate.

4. In a camera, a casing having an opening in the top thereof, a focusing screen in the rear of said casing, and having means adapted to position a sensitive plate in the rear of said screen, a lens, means for manipulating said lens to focus the image on said screen, a mirror adapted to reflect the image from said screen and to close the opening in said casing, and a unitary means attached to the lens, for causing the focusing of the image on the sensitive plate, said first-mentioned means attached to the mirror to close the opening in said casing, and said unitary means actuating said screen to remove the same from the cone of light, for causing the focusing of the image on the sensitive plate.

5. In a camera, a casing having an opening in the top thereof, a pair of spring rollers mounted at the top and bottom and to the rear of said casing, a screen mounted on said rollers, a pawl-and-ratchet connection connected with one of said rollers, to hold said screen in a predetermined position, a pivoted mirror adapted in one position, to close said opening, and in another position, to reflect the image from said screen, a lever pivoted to said screen and connected to said pawl-and-ratchet connection, a lens, means for moving said lens, a lever connected to said means, said lever terminating in a button, and a reach rod connecting said last-mentioned lever with the lever actuating the mirror, whereby pressing on said button will move said lens, and at the same time, will actuate said mirror, to close said opening, and will actuate said pawl-and-ratchet connection for causing the spring rollers to roll said screen out of the optical axis of said lens.

6. In a camera, a camera front having a lens slidably mounted therein, a spring roller mounted in said camera, a flexible connection between said spring roller and said lens, and means adapted to release said spring roller for causing said roller to change the position of said lens.

7. In a camera, a casing having an opening in the top thereof, a focusing screen within said casing, a door hinged to the front edge of said camera and adapted to close said opening, said door having an opening therethrough, a mirror hinged to the rear free edge of said door facing the opening in the same, and a second mirror hinged within said casing and engaging the under side of said door when in raised position, to position said door at an angle, said second-mentioned mirror facing the screen and the first-mentioned mirror whereby the image from said screen is reflected to said mirrors and through said openings.

8. In a camera, a casing having an opening in the top thereof, a focusing screen within said casing, a door hinged to the front edge of said camera and adapted to close said opening, said door having an opening therethrough, a mirror hinged to the rear free edge of said door facing the opening in the same, a second mirror hinged within said casing and engaging the under side of said door, to position said door at an angle to the opening in the casing, whereby the image from said screen is reflected to said mirrors and through said openings, and a door hinged to the top of said first-mentioned door to close the opening in the same.

In testimony whereof I have signed my name to this specification in the presence of two subscribing witnesses.

ANTHONY VORIS.

Witnesses:
A. G. BELKNAP,
FRANK P. SHEDD.